(12) United States Patent
Moon et al.

(10) Patent No.: US 11,397,020 B2
(45) Date of Patent: Jul. 26, 2022

(54) ARTIFICIAL INTELLIGENCE BASED APPARATUS AND METHOD FOR FORECASTING ENERGY USAGE

(71) Applicant: LG ELECTRONICS INC., Seoul (KR)

(72) Inventors: Gonsoo Moon, Seoul (KR); Dongin Kim, Seoul (KR); Kwanghyu Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 191 days.

(21) Appl. No.: 16/499,977

(22) PCT Filed: Jul. 5, 2019

(86) PCT No.: PCT/KR2019/008321
§ 371 (c)(1),
(2) Date: Oct. 1, 2019

(87) PCT Pub. No.: WO2021/006368
PCT Pub. Date: Jan. 14, 2021

(65) Prior Publication Data
US 2021/0215370 A1 Jul. 15, 2021

(51) Int. Cl.
*F24F 11/64* (2018.01)
*F24F 11/47* (2018.01)
(Continued)

(52) U.S. Cl.
CPC .............. *F24F 11/64* (2018.01); *F24F 11/47* (2018.01); *F24F 11/56* (2018.01); *G06N 3/08* (2013.01);
(Continued)

(58) Field of Classification Search
CPC .. F24F 11/64; F24F 11/56; F24F 11/47; F24F 2110/10; F24F 2120/14; F24F 2130/10;
(Continued)

(56) References Cited

U.S. PATENT DOCUMENTS 5,566,084 A * 10/1996 Cmar .................. G05D 23/1902
700/276
9,569,804 B2 * 2/2017 Stein .................... H02J 13/0079
(Continued)

FOREIGN PATENT DOCUMENTS

| JP | 6006072 B2 | 10/2016 |
|---|---|---|
| JP | 6018348 B1 | 11/2016 |
| KR | 10-2017-0062006 A | 6/2017 |
| KR | 10-2018-0130945 A | 12/2018 |
| KR | 10-1989493 B1 | 6/2019 |

*Primary Examiner* — Darrin D Dunn
(74) *Attorney, Agent, or Firm* — Birch, Stewart, Kolasch & Birch, LLP

(57) ABSTRACT

An artificial intelligence (AI) based apparatus and method for forecasting energy usage receives a request for providing power usage forecasting information of a first period including a current month with respect to an electronic apparatus of a user, divides a use period of the electronic apparatus into first to third sections, loads, from a memory, power actual-use data of a user or a plurality of users during the use period or a predetermined second period before the current month, calculates a daily forecasting weight given a weight based on weather or holiday information of the first period, and generates the power usage forecasting information based on the power actual-use data.

10 Claims, 10 Drawing Sheets

(51) Int. Cl.
*F24F 11/56* (2018.01)
*G06N 3/08* (2006.01)
*F24F 140/60* (2018.01)
*F24F 120/14* (2018.01)
*F24F 130/10* (2018.01)
*F24F 110/10* (2018.01)

(52) U.S. Cl.
CPC ....... *F24F 2110/10* (2018.01); *F24F 2120/14* (2018.01); *F24F 2130/10* (2018.01); *F24F 2140/60* (2018.01)

(58) Field of Classification Search
CPC ....... F24F 2140/60; G06N 3/08; G06N 20/00; G06N 5/04; G05B 15/02; G05B 2219/2639; G05B 2219/2642; G05B 13/0265; G05B 13/028; H02J 3/003
See application file for complete search history.

(56) References Cited

U.S. PATENT DOCUMENTS

| | | | |
|---|---|---|---|
| 2010/0313270 A1* | 12/2010 | Kim | G06F 21/552 726/24 |
| 2012/0245868 A1* | 9/2012 | Imahara | H02J 3/004 702/61 |
| 2015/0120075 A1* | 4/2015 | Le Roux | H02J 13/00016 700/296 |
| 2015/0192626 A1* | 7/2015 | Benes | G01R 21/00 702/62 |
| 2016/0196622 A1 | 7/2016 | Tokunaga | |
| 2018/0096247 A1* | 4/2018 | Maruhashi | G06N 3/084 |
| 2018/0285788 A1* | 10/2018 | Andrei | G06F 16/287 |
| 2019/0011970 A1* | 1/2019 | Youn | G06F 1/263 |
| 2019/0324831 A1* | 10/2019 | Gu | G06F 11/0778 |
| 2020/0333767 A1* | 10/2020 | Engelstein | H04Q 9/00 |

* cited by examiner

ARTIFICIAL INTELLIGENCE BASED APPARATUS AND METHOD FOR FORECASTING ENERGY USAGE

CROSS REFERENCE TO RELATED APPLICATIONS

This application is the National Phase of PCT International Application No. PCT/KR2019/008321, filed on Jul. 5, 2019, which is hereby expressly incorporated by reference into the present application.

FIELD

The present invention relates to an artificial intelligence based apparatus and method for forecasting energy usage.

BACKGROUND

Artificial intelligence is a field of computer engineering and information technology for researching a method of enabling a computer to do thinking, learning and self-development that can be done by human intelligence, and means that a computer can imitate a human intelligent action.

In addition, artificial intelligence does not exist in itself but has many direct and indirect associations with the other fields of computer science. In particular, today, attempts to introduce artificial intelligent elements to various fields of information technology to deal with issues of the fields have been actively made.

Meanwhile, recently, technologies for applying artificial intelligence to home appliances for various purposes have been attempted. The home appliances may be automatically programmed and controlled for various purposes without human intervention. For example, in the case of an energy usage forecasting apparatus, to which artificial intelligence is applied, technology for forecasting the amount of power using data accumulated in the home appliances or analyzing existing power consumption in consideration of various operation environments such as surrounding environments or climate and forecasting a future power consumption pattern has been developed.

Korean Patent Laid-Open Publication No. 2017-0062006 (simple home energy forecasting/alarm method and system) discloses technology for receiving a monthly electric rate to calculate monthly power usage, measures monthly power usage at at least one always-on power consumption apparatus, forecasting monthly power usage at at least one annual power consumption apparatus using the result of calculation and the result of measurement, and estimating the electric rate of a current month by referring to the result of calculation, the result of measurement and the result of forecasting.

However, the conventional technology may be inconvenient because a user needs to manually input data based on an electric bill. In addition, since calculation is performed with the past monthly power usage and a certain ratio of the annual always-on power consumption apparatus, the electric usage forecasted by the system may be incorrect.

SUMMARY

An object of the present invention devised to solve the problem lies in an energy usage forecasting apparatus for automatically collecting data on monthly power usage in order to reduce inconvenience that a user has to manually input data.

Another object of the present invention devised to solve the problem lies in a method of more accurately forecasting energy usage by automatically matching use similarity patterns of other users based on collected data.

An artificial intelligence (AI) based apparatus for forecasting energy usage includes a communication unit configured to receive a request for providing power usage forecasting information of a first period including a current month with respect to an electronic apparatus of a user, a memory configured to store power actual-use data indicating power usage of an electronic apparatus of each of a plurality of users, and a processor configured to load power actual-use data of the user during a predetermined second period before the current month, classify power actual-use data during the second period of the power actual-use data of each of a plurality of other users into a plurality of power use patterns according to time-series analysis, match a similar use pattern model which is a power use pattern corresponding to the loaded power actual-use data among the plurality of classified power use patterns, generate the power usage forecasting information of the first period with respect to the electronic apparatus of the user, based on power actual-use data of the first period of a previous year for at least one of the other users corresponding to the matched power use pattern.

In some embodiments, the processor may calculate a daily forecasting weight given a weight based on weather or holiday information of the first period, divide a use period of the electronic apparatus into first to third sections, and classify the user into any one of a low user, a middle user or a high user according to the periods to generate the power usage forecasting information.

In some embodiments, when the user is a low user who uses the electronic apparatus less than the first period, the processor may load, from the memory, power actual-use data of a corresponding month of the user and a corresponding-month average of the power actual-use data of each of the plurality of other users, and apply the daily forecasting weight to the power actual-use data of the corresponding month and the corresponding-month average to generate the power usage forecasting information.

When the user is a middle user, the processor may load the power actual-use data of the first period from the memory, and match a similar use pattern model which is a power use pattern corresponding to the loaded power actual-use data of the first period among the plurality of classified power use patterns.

The processor may match the similar use pattern model to the power actual-use data of the first period to calculate average energy of the same month of a previous year of a group belonging to the similar use pattern.

When the user is a high user, the processor may load power actual-use data of the past one year from the memory, and apply the daily forecasting weight to the power actual-use data of the past one year to generate the power usage forecasting information.

In some embodiments, the processor may generate a learning inference model using a machine learning or deep learning algorithm, and the power usage forecasting information may be learned and inferred using the learning inference model.

An artificial intelligence (AI) based method of forecasting energy usage includes a first step of receiving a request (voice) for providing power usage forecasting information of a first period (a corresponding month) including a current month with respect to an electronic apparatus (which is not limited to an air conditioner) of a user, a second step of dividing a use period of the electronic apparatus into first to third sections and loading, from a memory, power actual-use data of a user or a plurality of users during the use period or a predetermined second period before the current month, and a third step of calculating a daily forecasting weight given a weight based on weather or holiday information of the first period and generating the power usage forecasting information based on the power actual-use data.

In some embodiments, the second step may include classifying the user into any one of a low user, a middle user or a high user according to the use period of the electronic apparatus.

In some embodiments, the second step may include, when the user is a low user who uses the electronic apparatus less than the first period, loading, from the memory, power actual-use data of a corresponding month of the user and a corresponding-month average of power actual-use data of each of a plurality of other users, and applying the daily forecasting weight to the power actual-use data of the corresponding month and the corresponding-month average to generate the power usage forecasting information.

In some embodiments, the second step may include loading the power actual-use data of the first period from the memory, and matching a similar use pattern model which is a power use pattern corresponding to the loaded power actual-use data of the first period among the plurality of classified power use patterns.

The matching of the similar use pattern model may include extracting the power actual-use data of the first period with respect to a predetermined electronic apparatus, performing supervised learning of pattern similarity with respect to the power actual-use data of the first period, and assigning a pattern number to the predetermined electronic apparatus to perform supervised learning and generating an inference model of a corresponding month.

In some embodiments, when the second step may include loading power actual-use data of the past one year from the memory, and applying the daily forecasting weight to the power actual-use data of the past one year to generate the power usage forecasting information.

In some embodiments, the third step may include calculating usage of the electronic apparatus during the first period, calculating power usage of the electronic apparatus based on weather or holiday information, and giving a weight based on the weather or holiday information of the first period to generate the power usage forecasting information.

DETAILED DESCRIPTION

Figure 1:
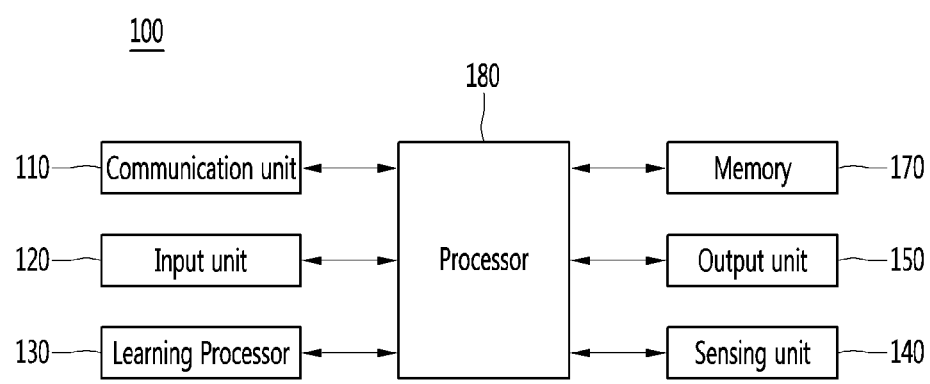
FIG. 1 is a diagram showing an artificial intelligence (AI) device according to an embodiment of the present invention.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" or "unit" may be used to refer to elements or components. Use of such a suffix herein is merely intended to facilitate description of the specification, and the suffix itself is not intended to have any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

While ordinal numbers including 'first', 'second', etc. may be used to describe various components, they are not intended to limit the components. These expressions may be used to distinguish one component from another component When it is said that a component is 'coupled with/to' or 'connected to' another component, it should be understood that the one component is connected to the other component directly or through any other component in between. On the other hand, when it is said that a component is 'directly connected to' or 'directly coupled to' another component, it should be understood that there is no other component between the components.

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present invention.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI device 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
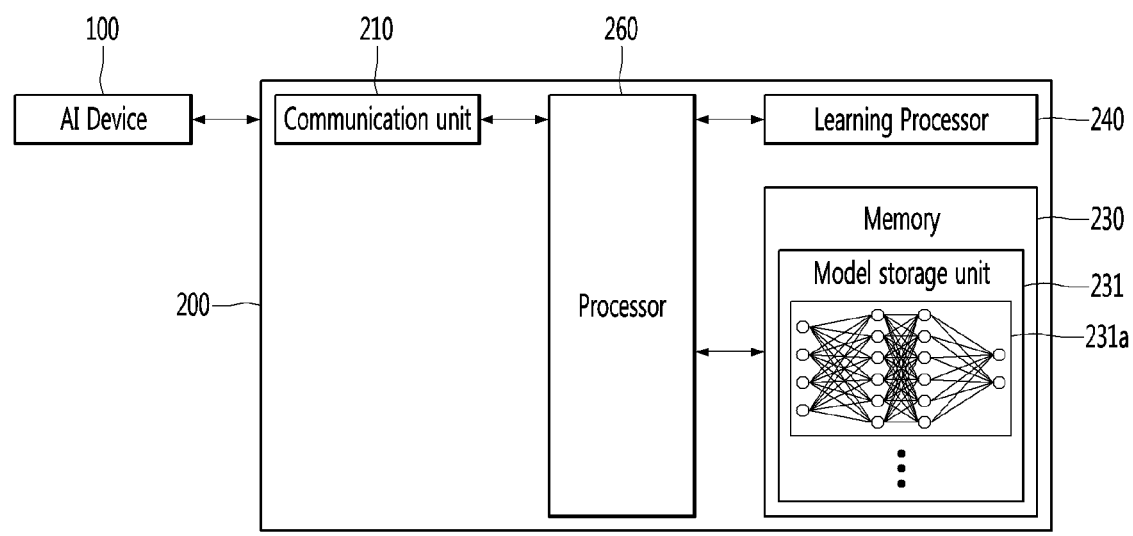
FIG. 2 is a diagram showing an AI server according to an embodiment of the present invention.

FIG. 2 illustrates an AI server 200 according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
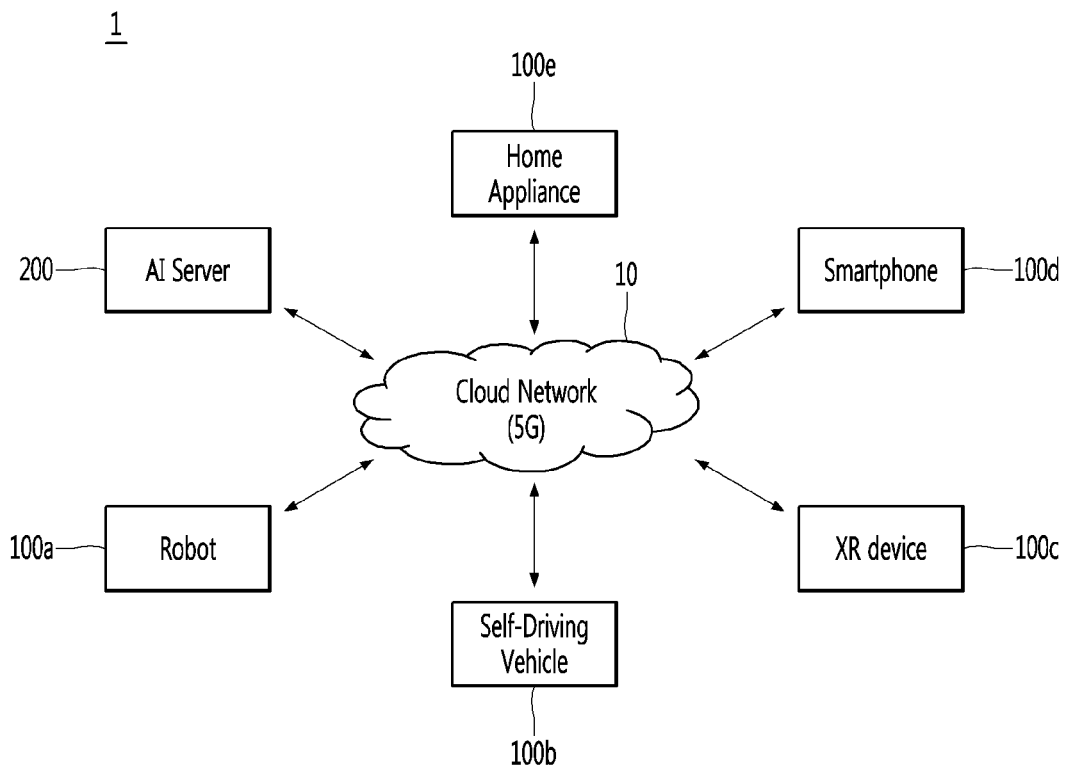
FIG. 3 is a diagram showing an AI system according to an embodiment of the present invention.

FIG. 3 illustrates an AI system 1 according to an embodiment of the present invention.

Referring to FIG. 3, in the AI system 1, at least one of an AI server 200, a robot 100a, a self-driving vehicle 10b, an XR device 100c a smartphone 100d, or a home appliance 100e is connected to a cloud network 10. The robot 100a, the self-driving vehicle 10b, the XR device 100c the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 10b, the XR device 100c the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

The self-driving vehicle 10b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

At this time, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external apparatus to determine the travel route and the travel plan, and may control the driving unit such that the self-driving vehicle 100*b* travels along the determined travel route and travel plan.

The map data may include object identification information about various objects arranged in the space (for example, road) in which the self-driving vehicle 100*b* travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100*b* may perform the operation or travel by controlling the driving unit based on the control/interaction of the user. At this time, the self-driving vehicle 100*b* may acquire the intention information of the interaction due to the user's operation or speech utterance, and may determine the response based on the acquired intention information, and may perform the operation.

The XR device 100*c* to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100*c* may analyzes three-dimensional point cloud data or image data acquired from various sensors or the external devices, generate position data and attribute data for the three-dimensional points, acquire information about the surrounding space or the real object, and render to output the XR object to be output. For example, the XR device 100*c* may output an XR object including the additional information about the recognized object in correspondence to the recognized object.

The XR device 100*c* may perform the above-described operations by using the learning model composed of at least one artificial neural network. For example, the XR device 100*c* may recognize the real object from the three-dimensional point cloud data or the image data by using the learning model, and may provide information corresponding to the recognized real object. The learning model may be directly learned from the XR device 100*c* or may be learned from the external device such as the AI server 200.

At this time, the XR device 100*c* may perform the operation by generating the result by directly using the learning model, but the sensor information may be transmitted to the external device such as the AI server 200 and the generated result may be received to perform the operation.

The robot 100*a*, to which the AI technology and the self-driving technology are applied, may be implemented as a guide robot, a carrying robot, a cleaning robot, a wearable robot, an entertainment robot, a pet robot, an unmanned flying robot, or the like.

The robot 100*a*, to which the AI technology and the self-driving technology are applied, may refer to the robot itself having the self-driving function or the robot 100*a* interacting with the self-driving vehicle 100*b*.

The robot 100*a* having the self-driving function may collectively refer to a device that moves for itself along the given movement line without the user's control or moves for itself by determining the movement line by itself.

The robot 100*a* and the self-driving vehicle 100*b* having the self-driving function may use a common sensing method so as to determine at least one of the travel route or the travel plan. For example, the robot 100*a* and the self-driving vehicle 100*b* having the self-driving function may determine at least one of the travel route or the travel plan by using the information sensed through the lidar, the radar, and the camera.

The robot 100*a* that interacts with the self-driving vehicle 100*b* exists separately from the self-driving vehicle 100*b* and may perform operations interworking with the self-driving function of the self-driving vehicle 100*b* or interworking with the user who rides on the self-driving vehicle 100*b*.

At this time, the robot 100*a* interacting with the self-driving vehicle 100*b* may control or assist the self-driving function of the self-driving vehicle 100*b* by acquiring sensor information on behalf of the self-driving vehicle 100*b* and providing the sensor information to the self-driving vehicle 10*b*, or by acquiring sensor information, generating environment information or object information, and providing the information to the self-driving vehicle 100*b*.

Alternatively, the robot 100*a* interacting with the self-driving vehicle 100*b* may monitor the user boarding the self-driving vehicle 10*b*, or may control the function of the self-driving vehicle 100*b* through the interaction with the user. For example, when it is determined that the driver is in a drowsy state, the robot 100*a* may activate the self-driving function of the self-driving vehicle 100*b* or assist the control of the driving unit of the self-driving vehicle 100*b*. The function of the self-driving vehicle 100*b* controlled by the robot 100*a* may include not only the self-driving function but also the function provided by the navigation system or the audio system provided in the self-driving vehicle 100*b*.

Alternatively, the robot 100*a* that interacts with the self-driving vehicle 100*b* may provide information or assist the function to the self-driving vehicle 100*b* outside the self-driving vehicle 100*b*. For example, the robot 100*a* may provide traffic information including signal information and the like, such as a smart signal, to the self-driving vehicle 10*b*, and automatically connect an electric charger to a charging port by interacting with the self-driving vehicle 100*b* like an automatic electric charger of an electric vehicle.

The robot 100*a*, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100*a*, to which the XR technology is applied, may refer to a robot that is subjected to control/interaction in an XR image. In this case, the robot 100*a* may be separated from the XR device 100*c* and interwork with each other.

When the robot 100*a*, which is subjected to control/interaction in the XR image, may acquire the sensor information from the sensors including the camera, the robot 100*a* or the XR device 100*c* may generate the XR image based on the sensor information, and the XR device 100*c* may output the generated XR image. The robot 100*a* may operate based on the control signal input through the XR device 100*c* or the user's interaction.

For example, the user can confirm the XR image corresponding to the time point of the robot 100*a* interworking remotely through the external device such as the XR device 100*c* adjust the self-driving travel path of the robot 100*a* through interaction, control the operation or driving, or confirm the information about the surrounding object.

The self-driving vehicle 10*b*, to which the AI technology and the XR technology are applied, may be implemented as a mobile robot, a vehicle, an unmanned flying vehicle, or the like.

The self-driving driving vehicle 10b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 10b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 10b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
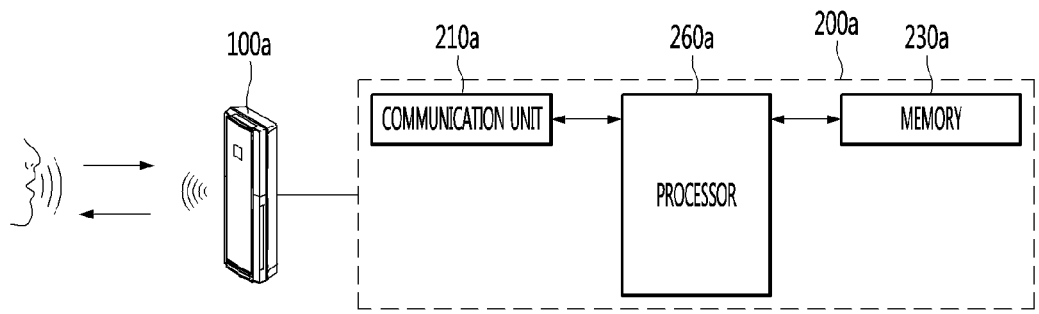
FIG. 4 is a diagram showing the configuration of an AI-based apparatus for forecasting energy usage according to an embodiment of the present invention.

FIG. 4 is a diagram showing the configuration of an AI-based apparatus 200a for forecasting energy usage according to an embodiment of the present invention.

Referring to FIG. 4, the energy usage forecasting apparatus 200a may include a communication unit 210a, a memory 230a and a processor 260a. In addition, the energy usage forecasting apparatus 200a may be linked with an electronic apparatus 100a to receive a request for providing power usage forecasting information from the electronic apparatus 100a and to control the electronic apparatus 100a through the processor 260a.

The communication unit 210a may receive a request for providing power usage forecasting information of a first period including a current month with respect to the electronic apparatus 100a of a user. The communication unit 210a may transmit and receive data to and from external apparatuses such as other AI devices 100a to 100e or an AI server 200 using wired/wireless communication technology similarly to the communication unit 100a described with reference to FIG. 1. For example, the communication unit 100 may transmit and receive sensor information, user input, a learning model, a control signal, etc. to and from external devices.

At this time, the communication unit 210a may perform transmission and reception using GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, or NFC (Near Field Communication).

The memory 230a may store power actual-use data indicating power usage of the electronic apparatus 100a of each of a plurality of users. Existing data on the power usage of each of the plurality of users may be automatically received from each electronic apparatus and stored in the memory 230a.

The processor 260a may collect history information including operation of the AI device 100 or feedback of a user on the operation and transmit the history information to an external server or a database (not shown) through the communication unit 210a. The collected history information may be used to update a learning model.

The processor 260a may load the power actual-use data of the user during a predetermined second period (the last three months or a predetermined period) before the current month from the memory 230a and classify the power actual-use data during the second period of the power actual-use data of the plurality of other users into a plurality of power use patterns according to time-series analysis.

The processor 260a may calculate a daily forecasting weight given weight based on weather or holiday information of the first period, divide the use period of the electronic apparatus 100a into first to third sections, classify the user into any one of a low user, a middle user or a high user according to the periods, and generate the power usage forecasting information.

According to the embodiment of the present invention, the first section may be less than three months, the second section may be equal to three months and less than one year, and the third section may be equal to or greater than one year, without being limited, and the sections may be variously set according to the period in which the user uses the electronic apparatus 100a. In the embodiment of the present invention, the user may be classified into the low user, the middle user or the high user according to each period and a process of generating power usage forecasting information may be changed according to the classified period.

A process of processing each data according to the embodiment of the present invention will be described in detail below in the following forecasting method. Here, user classification and data processed according to each user will be described.

When the user is a low user who uses the electronic apparatus during a period corresponding to the first section, the processor 260a may load, from the memory 230a, current-month power actual-use data of the user and a current-month average of the power actual-use data of each of the plurality of other users, and apply the daily forecasting weight to the current-month power actual-use data and the current-month average to generate the power usage forecasting information. The period may be less than the first period.

When the user is a middle user, the processor 260a may load the power actual-use data of the first period from the memory 230a and match a similar use pattern model which is a power use pattern corresponding to the loaded power actual-use data of the first period among the plurality of classified power use patterns. In this case, the processor 260a may match the similar use pattern model to the power actual-use data of the first period, thereby calculating average energy of the same month of a previous year of a group belonging to the similar use pattern.

When the user is a high user, the processor 260a may load the power use data of the past one year from the memory 230a and apply the daily forecasting weight to the power actual-use data of the past one year to generate the power usage forecasting information.

According to the embodiment of the present invention, the processor 260a matches a similar use pattern model which is a power use pattern corresponding to the loaded power use data among the plurality of classified power use patterns, and generates the power usage forecasting information of the first period with respect to the electronic apparatus 100a of the user, based on the power actual-use data of the first period of the previous year (average energy of the same month of the previous year) for at least one of other users corresponding to the matched power use pattern (the group belonging to the similar use pattern).

The processor 260a may generate a learning inference model using a machine learning or deep learning algorithm and learn and infer the power usage forecasting information using the learning inference model.

The processor 260a may determine and perform operation based on information determined or generated using a data analysis algorithm or a machine learning algorithm. To this end, the processor 260a may request, retrieve, receive or utilize data of a learning processor or the memory 230a.

The processor 260a may acquire intention information corresponding to program change of the user or acquire intention information corresponding to user input using at least one of a speech to text (STT) engine for converting voice input into text or a natural language processing (NLP) engine for acquiring intention information of a natural language.

Figure 5:
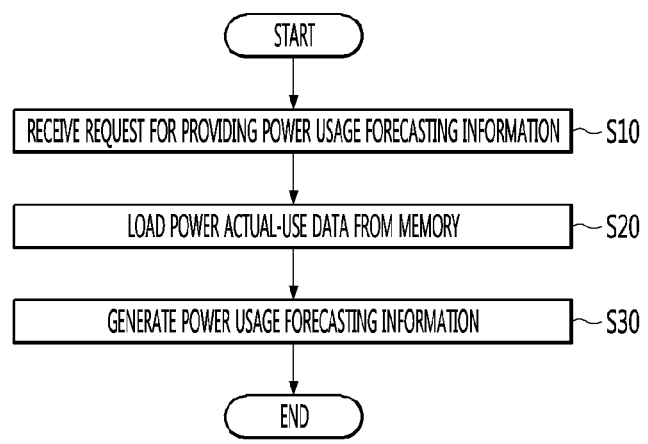
FIG. 5 is a flowchart illustrating a method of forecasting energy usage according to an embodiment of the present invention.

FIG. 5 is a flowchart illustrating a method of forecasting energy usage according to an embodiment of the present invention.

Referring to FIG. 5, the artificial intelligence based energy usage forecasting method may include a first step S10 of receiving a request for providing power usage forecasting information, a second step S20 of loading power actual-use data from the memory 230a and a third step S30 of generating power usage forecasting information based on the power use data.

The first step S10 is a step of receiving the request for providing the power usage forecasting information of the first period including a current month with respect to the electronic apparatus 100a of the user.

According to the embodiment of the present invention, when the user asks about an "estimated electric rate" with respect to the electronic apparatus 100a by voice, usage and electric rate according to the usage may be provided. Although voice is used in the embodiment, the user may directly input a question to the electronic apparatus 100a.

The second step S20 is a step of dividing the use period of the electronic apparatus 100a into the first to third sections and loading, from the memory 230a, power actual-use data of a user or a plurality of users during the use period or the second period set before the current month.

Unlike to the conventional technology, all data may be extracted based on data input from the electronic apparatus 100a to the memory 230a, and may be stored and extracted through an external server or a database (not shown) along with the memory 230a as necessary.

The third step S30 is a step of calculating the daily forecasting weight given a weight based on the weather or holiday information of the first period, generating the power usage forecasting information based on the power actual-use data, and providing the power usage forecasting information to the user.

The detailed process of the first step S10 to the third step S30 will be described in detail below with reference to FIGS. 6 to 10.

According to the embodiment of the present invention, when the user requests the electric rate from the electronic apparatus 100a, the electronic apparatus 100a may provide information indicating "Your total usage of the last week is 00 kwh, the total usage of this month may be 00 kwh if you uses the electric apparatus at the current level, and the electric rate may be about $00.00 without applying a progressive tax.

According to the embodiment of the present invention, the forecasting apparatus 200a may directly perform speech recognition from the electronic apparatus 100a or receive information through a speech recognition system linked with the electronic apparatus 100a by voice.

Figure 6:
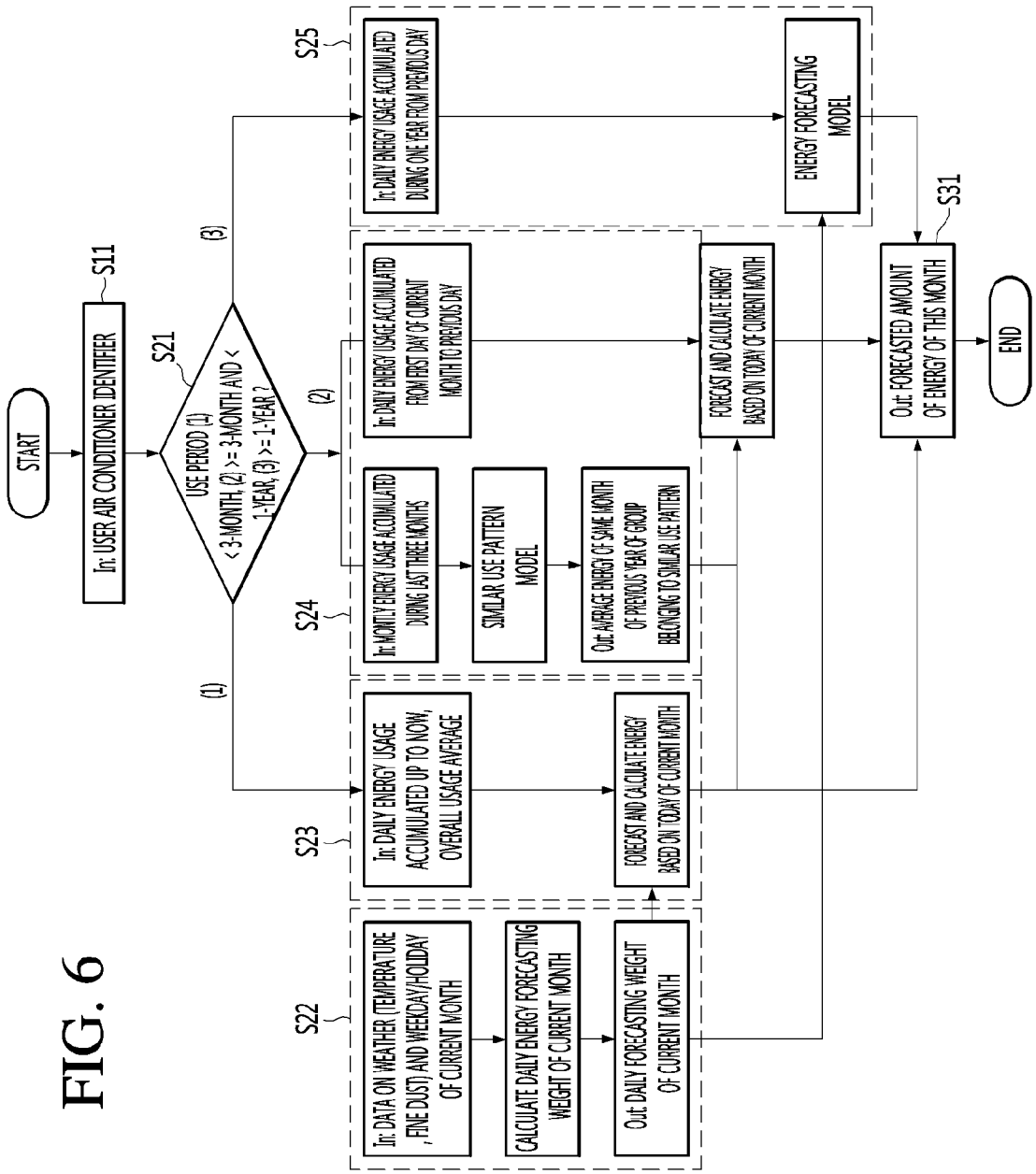
FIG. 6 is a detailed flowchart of FIG. 5.

FIG. 6 is a detailed flowchart of FIG. 5.

Referring to FIG. 6, the embodiment of the first step S10 to the third step S30 described with reference to FIG. 5 will be described in detail.

In the first step S10, the request for providing the power usage forecasting information is received. When the request for providing the power usage forecasting information with respect to the electronic apparatus 100a of the user is received, an identifier of the electronic apparatus 100a may be input (S11). The identifier may be generated for each electronic apparatus 100a and the use period of the electronic apparatus 100a may be calculated according to the identifier.

As described above, in the second step S20, the user is classified into a low user, a middle user or a high user according to the use period and data processed according to each use period is set (S21).

According to the embodiment of the present invention, the third step S30 includes a step of calculating the daily forecasting weight given the weight based on the weather or holiday information of the first period. The weight applied to the first step S10 and the second step S20 may be calculated or the weight may be previously calculated regardless of the first step S10 and the second step S20 and applied to the third step S30.

In step S22, the daily energy forecasting weight is calculated using the weather and holiday information of the current month. In step S22, first, a monthly special-day weight which is a ratio of an average power usage of a special day to an average power usage of a weekday of a particular month is calculated. The monthly average power usage of Monday, Saturday and Sunday may be summarized as daily average power usage.

According to the embodiment, a monthly power usage temperature correction value may be calculated using a difference between a temperature measured on a weekday in the past and an average temperature, and the monthly power usage temperature correction value may be applied to correct the past average weekday power usage.

Monthly temperature sensitivity may be calculated by normalizing monthly weekday or holiday power usage based on the power actual-use data of a corresponding month, and the monthly power usage temperature correction value may be calculated by applying the monthly temperature sensitivity to the difference between the temperature measured in the past weekday/holiday and the average temperature.

The daily forecasting weight of the current month calculated in step S22 may be applied to the power usage forecasting information calculated for each low user, middle user or high user, thereby finally calculating a forecasted amount of energy.

In the second step before step S22 is applied, the user may be classified as the low user, the middle user or the high user according to the use period of the user with respect to the electronic apparatus 100a, thereby generating the power usage forecasting information (S31).

In the case of the low user, the use period of less than three months may be set (S23) according to the embodiment of the present invention. In this case, data on accumulated daily energy usage and the average of the electronic apparatus 100a may be referred to.

In the case of the middle user, according to the embodiment of the present invention, with respect to the electronic apparatus 100a, the use period of which is equal to three month and less than one year, data of the energy data of the last three months may be processed (S24) to obtain the average energy value of the similar pattern through the "similar use pattern model" and the power actual-use data of the current month and the daily forecasting weight of the current month may be applied.

In the case of the high user, since the use period is equal to or greater than one year, forecasting may be made by generating a forecasting model based on the power actual-use data of one year and the daily forecasting weight of the current month.

Figure 7:
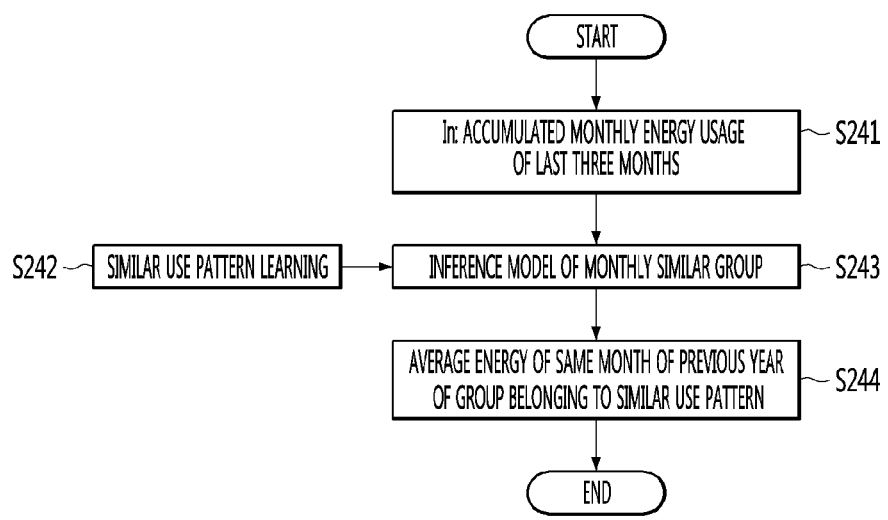
FIG. 7 is a flowchart of a similar use pattern model according to an embodiment of the present invention.

FIG. 7 is a flowchart of a similar use pattern model according to an embodiment of the present invention.

Referring to FIG. 7, in the similar use pattern model, the energy usage accumulated for the last three months may be received (S241), an inference model of a monthly similar group may be derived (S243), and the average energy of the same month of the previous year of the group belonging to the similar use pattern may be obtained (S244).

According to an embodiment of the present invention, the similar use pattern model is applicable to the middle user, and the inference model of the monthly similar group may be derived based on the usage accumulated during the period of three months. The application and result thereof will be described below with reference to FIGS. 9 and 10.

Figure 8:
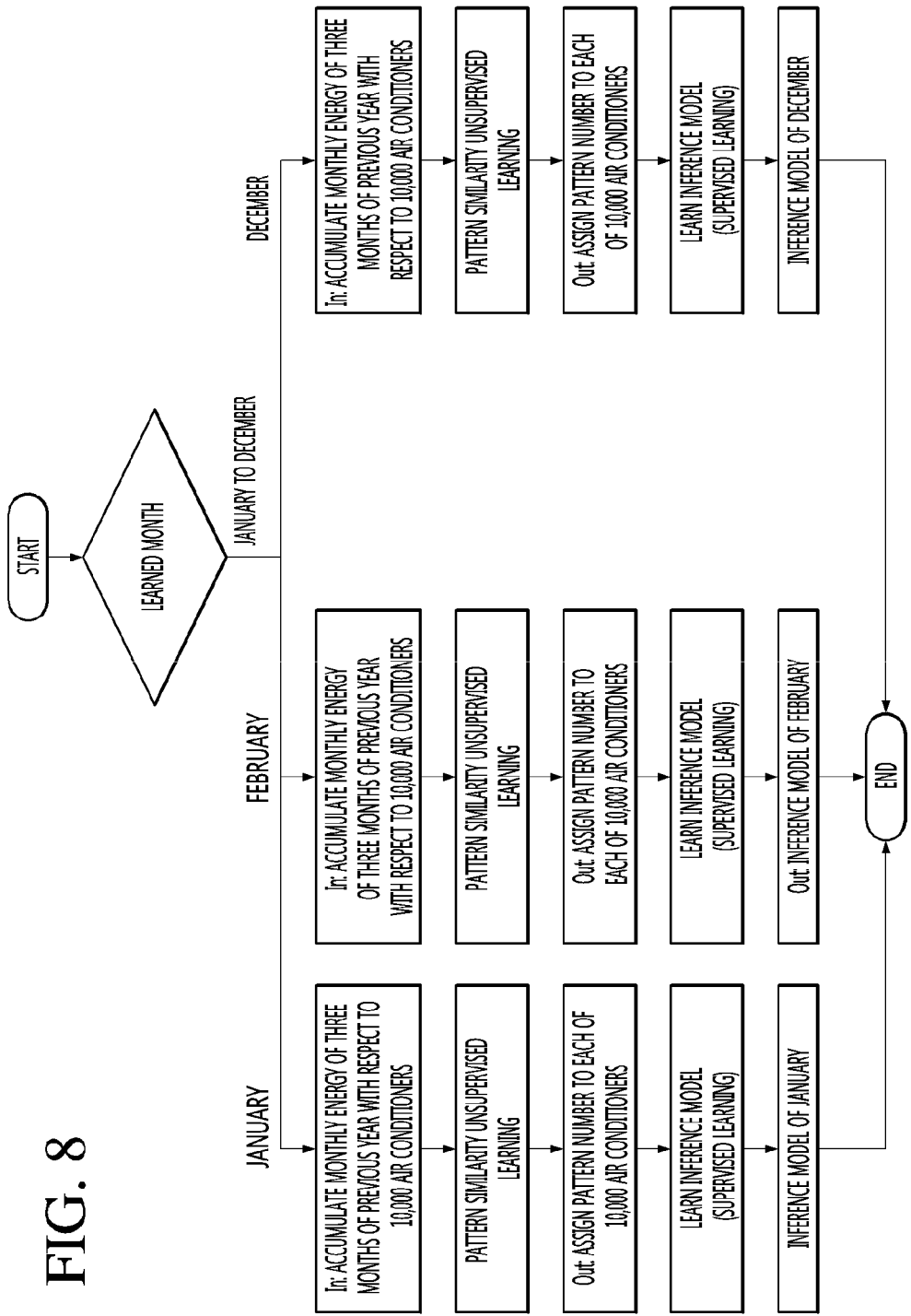
FIG. 8 is a flowchart illustrating learning using a similar use pattern model according to an embodiment of the present invention.

FIG. 8 is a flowchart S242 illustrating learning using a similar use pattern model according to an embodiment of the present invention.

Referring to FIG. 8, the flowchart illustrating similar use pattern learning applied to the similar use pattern model is shown. Power actual-use data of three months may be monthly collected according to the predetermined number of electronic apparatuses 100a, a pattern number may be assigned through supervised learning of pattern similarity and a monthly inference model may be derived through inference model learning.

According to an embodiment of the present invention, based on the power actual-use data of the past three months (for example, October to December 2017, in the case of January 2018) of each of 12 months (January to December) to be learned, an inference model of each month may be generated through similar use pattern learning.

Similar use pattern learning of the present invention may include clustering power actual-use data, projecting an obtained output cluster onto an input space to create a decision tree, finishing a learning process when a result of initializing and learning a model is within a tolerance range, and gradually increasing the number of clusters to project the clusters onto the input space again when the result is out of the tolerance range.

Figure 9:
FIG. 9 is a view showing various types of similar use patterns appearing through learning of FIG. 8.

FIG. 9 is a view showing various types of similar use patterns appearing through learning of FIG. 8.

Referring to FIG. 9, according to the embodiment of the present invention, the learned month is August 2018 and monthly power actual-use data (e.g., 10,000 electronic apparatus) from May to July 2018 is applied as use data.

According to an embodiment of the present invention, a result of generating 100 patterns (clustering) through a time-series similarity analysis (Dynamic Time Warping) and K-means algorithm is shown.

In each pattern according to the embodiment of the present invention, a pattern having a large thickness is accumulation of power actual-use data of each electronic apparatus 100a and indicates the number of users who used each electronic apparatus 100a. 0 of the Z-axis of each chart means May, 1 means June, 2 means July and the Y-axis indicates usage of one month.

That is, in the case of the middle user, use of each month may be inferred based on the power actual-use data of three months, the power actual-use data during the above-described period of the power actual-use data of each of the plurality of other users may be classified into a plurality of power use patterns according to time-series analysis, and a similar use pattern model which is a power use pattern corresponding to the loaded power actual-use data among the plurality of classified power use patterns may be matched.

Therefore, the processor 260a may generate the power usage forecasting information corresponding to the matched power use pattern and forecast future energy usage.

Figure 10:
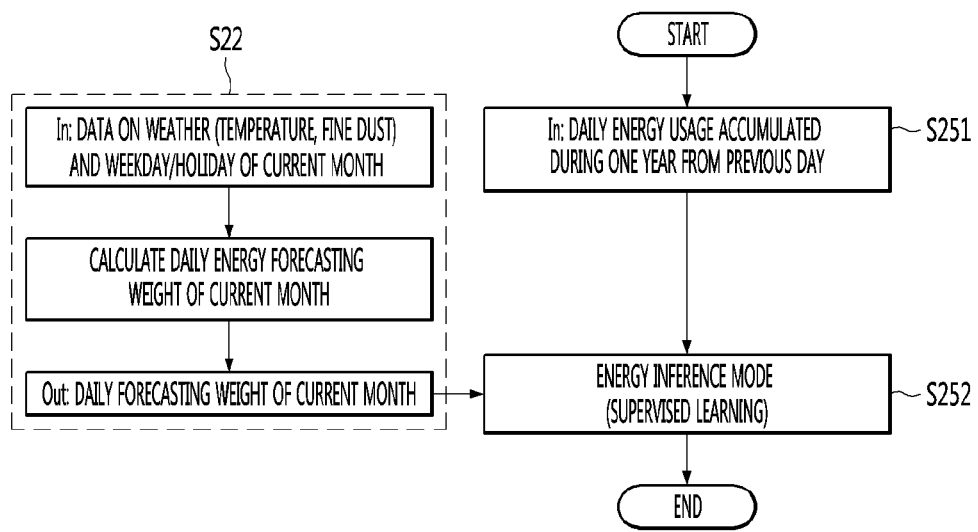
FIG. 10 is a flowchart illustrating a method generating power usage forecasting information by applying a weight to each step according to an embodiment of the present invention.

FIG. 10 is a flowchart illustrating a method generating power usage forecasting information by applying a weight to each step according to an embodiment of the present invention.

Referring to FIG. 10, according to one embodiment of the present invention, in the case of the high user, learning and inference models may be generated based on the power actual-use data of the past one year (S251 and S252).

In the case of the high user, forecasting is possible based on the daily forecasting weight of the current month and daily power actual-use data of one year from the previous day, and the daily forecasting weight of the current month calculated in step S21 is applicable (S22).

Figure 11:
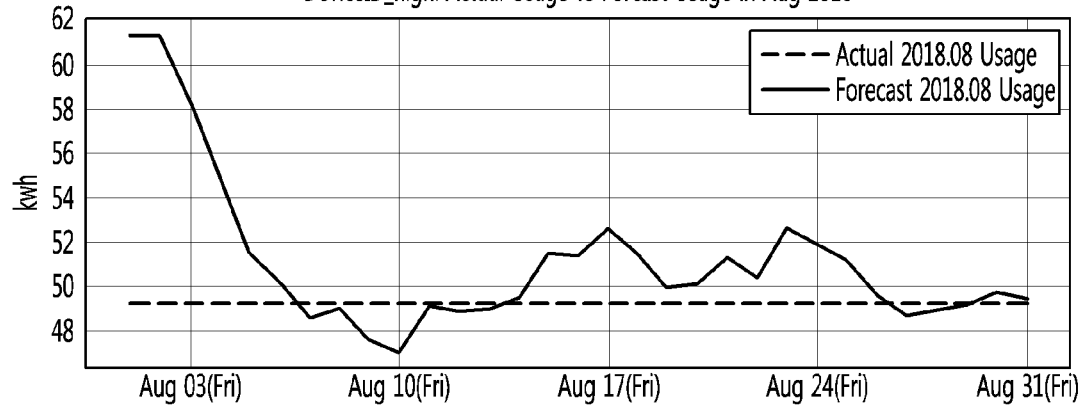
FIG. 11 is a view showing change in energy usage of 9 electronic apparatuses for a certain period according to an embodiment of the present invention.
Figure 11:
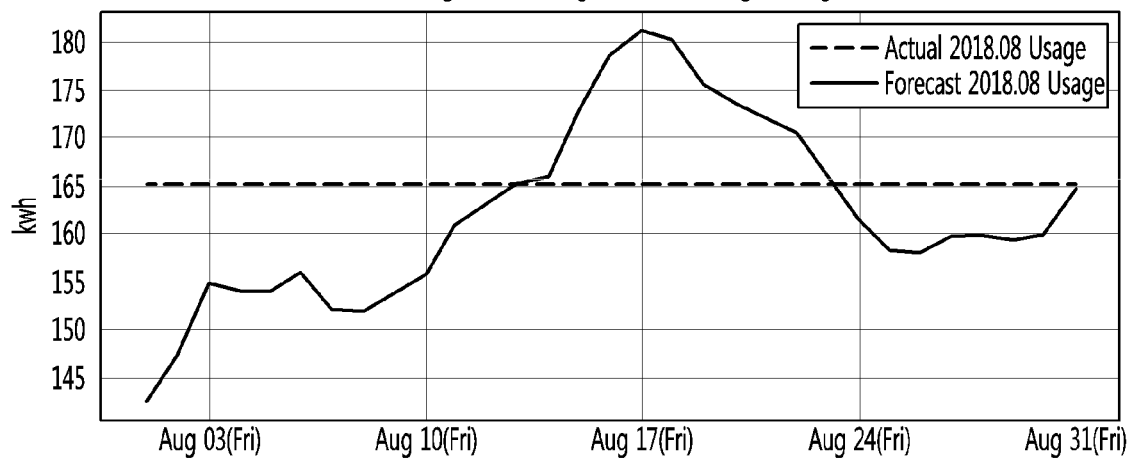
Figure 12:
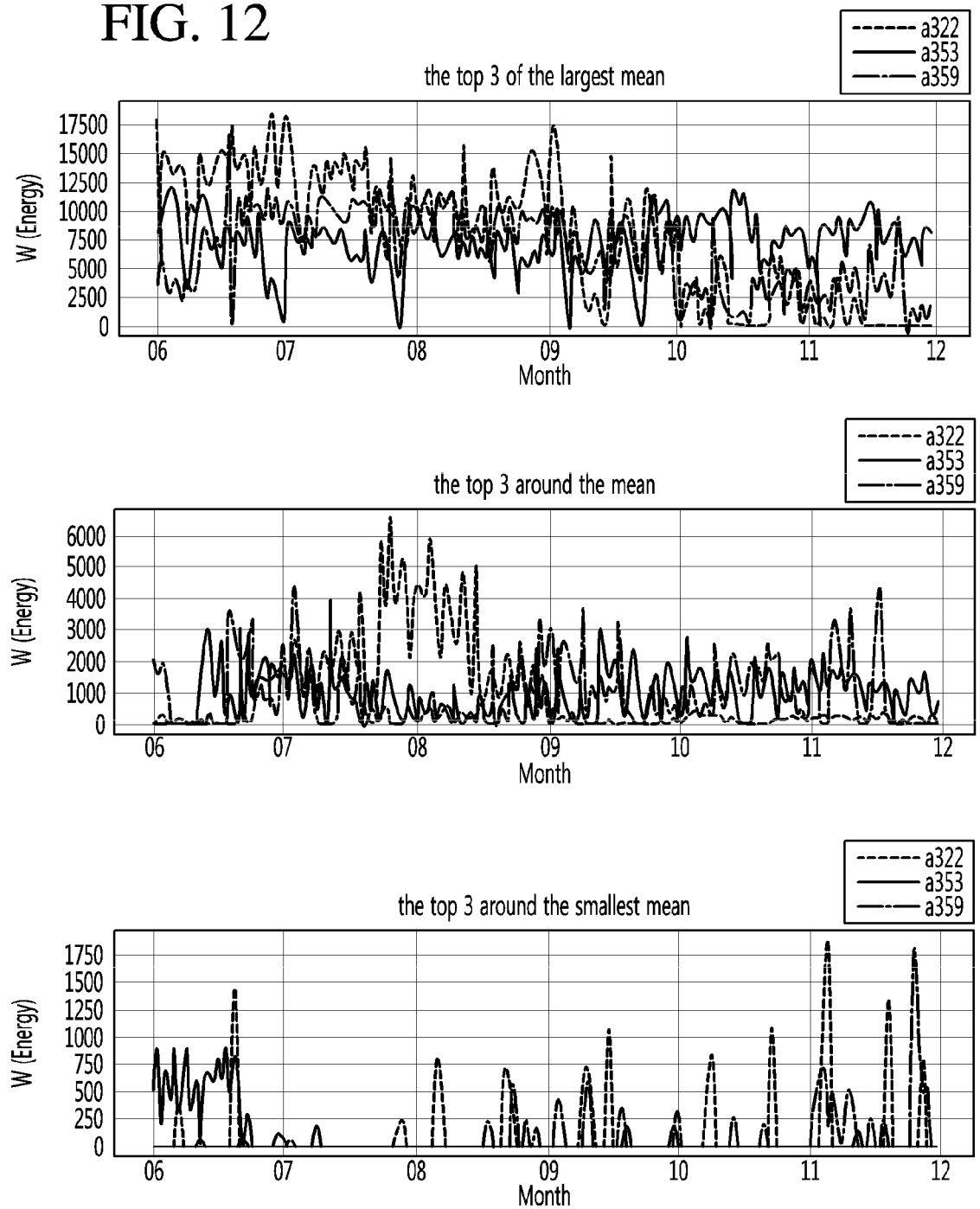
FIG. 12 is a view showing change in daily energy usage of two electronic apparatuses according to an embodiment of the present invention.

FIGS. 11 and 12 are views showing change in energy usage of 9 electronic apparatuses 100a for a certain period and change in daily energy usage of two electronic apparatuses 100a according to an embodiment of the present invention.

FIG. 11 shows daily power actual-use data of 9 electronic apparatuses 100a during a certain period of June to December 2017. Since the 9 electronic apparatuses 100a have different power use patterns, the forecasting method according to the embodiment of the present invention is applicable.

In FIG. 12, the actual usage (about 49 kwh) of August 2018 of a user (DeviceID_high) is known, the one-month (August) usage estimated on August 1 is about 61 kwh, one-month (August) usage estimated on August 3 is about 58 kwh, one-month (August) usage estimated on August 10 is about 47 kwh, one-month (August) usage estimated on August 24 is about 52 kwh, one-month (August) usage estimated on August 31 is about 48 kwh.

Similarly, a user DeviceID_low may be interpreted in the same manner. Although power actual-use data of one month is not known, a one-month forecasting value may be provided every day, thereby notifying the user of usage of the electronic apparatus 100a.

According to the embodiment of the present invention, the power usage forecasting information may be generated such that the user becomes aware of an estimated quantity of electricity in the summer in which usage of home appliances rapidly increases. Therefore, it is possible to alleviate a worry about the electric rate and to make the user more comfortable by adjusting usage of home appliances.

According to the embodiment of the present invention, it is possible to provide a service for forecasting the total electric rate of a household and to conveniently forecast the total electric rate of the household.

According to the embodiment of the present invention, since power usage forecasting information is generated, a user becomes aware of an estimated quantity of electricity in the summer in which usage of home appliances rapidly increases, thereby alleviating a worry about an electric rate.

According to the embodiment of the present invention, the user can be made more comfortable, by adjusting usage of the home appliances.

According to the embodiment of the present invention, it is possible to provide a service for forecasting the total electric rate of a household. In a household having a smart meter, it is possible to forecast the total electric rate using the configuration and technology of the present invention.

The foregoing description is merely illustrative of the technical idea of the present invention, and various changes and modifications may be made by those skilled in the art without departing from the essential characteristics of the present invention.

Therefore, the embodiments disclosed in the present invention are to be construed as illustrative and not restrictive, and the scope of the technical idea of the present invention is not limited by these embodiments.

The scope of the present invention should be construed according to the following claims, and all technical ideas within equivalency range of the appended claims should be construed as being included in the scope of the present invention.

What is claimed is:

1. An artificial intelligence (AI) based apparatus for forecasting energy usage, the AI based apparatus comprising: a configured to receive a request for providing power usage forecasting information of a first period including a current month with respect to an electronic apparatus of a user; a memory configured to store power actual-use data indicating power usage of an electronic apparatus of each of a plurality of configured to: load power actual-use data, of the user during a predetermined second period before the current month, classify, power actual-use data during the predetermined second period of the power actual-use data of each of a plurality of other users into a plurality of power use patterns according to time-series analysis, match a similar use pattern model which is a power use pattern corresponding to the loaded power actual-use data among the plurality of classified power use patterns, generate the power usage forecasting information of the first period with respect to the electronic apparatus of the user, based on power actual-use data of the first period of a previous year for at least one of the other users corresponding to the matched power use pattern, wherein the processor: calculates a daily forecasting weight given a weight based on weather or holiday information of the first period, divides a use period of the electronic apparatus into first to third sections, and classifies the user into any one of a low user, a middle user or a high user according to the use period to generate the power usage forecasting information, and wherein, when the user is the low user who uses the electronic apparatus during a period corresponding to the first section, the processor: loads, from the memory, power actual-use data of a corresponding month of the user and a corresponding-month average of the power actual-use data of each of the plurality of other user; applies the daily forecasting weight to the power actual-use data of the corresponding month and the corresponding-month average to generate the power usage forecasting information; and controls the electronic apparatus of the user based on the generated power usage forecasting information.

2. The AI based apparatus according to claim 1, wherein, when the user is the middle user, the processor:
loads the power actual-use data of the first period from the memory, and
matches a similar use pattern model which is a power use pattern corresponding to the loaded power actual-use data of the first period among the plurality of classified power use patterns.

3. The AI based apparatus according to claim 2, wherein the processor matches the similar use pattern model to the power actual-use data of the first period to calculate average energy of a same month of a previous year of a group belonging to the similar use pattern.

4. The AI based apparatus according to claim 1, wherein, when the user is the high user, the processor:
loads power actual-use data of the past one year from the memory, and
applies the daily forecasting weight to the power actual-use data of the past one year to generate the power usage forecasting information.

5. The AI based apparatus according to claim 1,
wherein the processor generates a learning inference model using a machine learning or deep learning algorithm, and
wherein the power usage forecasting information is learned and inferred using the learning inference model.

6. An artificial intelligence (AI) based method of forecasting energy usage, the AI based method comprising: a first step of receiving a request for providing power usage forecasting information of a first period including a current month with respect to an electronic apparatus of a user; a second step of dividing a use period of the electronic apparatus into first to third sections and loading, from a memory, power actual-use data of a user or a plurality of users during the use period or a predetermined second period before the current month; and a third step of calculating a daily forecasting weight given a weight based on weather or holiday information of the first period and generating the power usage forecasting information based on the power actual-use data, wherein the second step includes classifying the user into any one of a low user, a middle user or a high user according to the use period of the electronic apparatus, and wherein the second step includes: when the user is a low user who uses the electronic apparatus less than the first period, loading, from the memory, power actual-use data of a corresponding month of the user and a corresponding-month average of power actual-case data of each of a plurality of other users; applying the daily forecasting weight to the power actual-use data of the corresponding month and the corresponding-month average to generate the power usage forecasting information, and controlling the electronic apparatus of the user based on the generated power usage forecasting information.

7. The AI based method according to claim 6, wherein the second step includes:
loading the power actual-use data of the first period from the memory; and
matching a similar use pattern model which is a power use pattern corresponding to the loaded power actual-use data of the first period among the plurality of classified power use patterns.

8. The AI based method according to claim 7, wherein the matching of the similar use pattern model includes:
extracting the power actual-use data of the first period with respect to a predetermined electronic apparatus;

performing unsupervised learning of pattern similarity with respect to the power actual-use data of the first period; and assigning a pattern number to the predetermined electronic apparatus to perform supervised learning and generating an inference model of a corresponding month.

9. The AI based method according to claim 6, wherein, when the second step includes:

loading power actual-use data of the past one year from the memory; and applying the daily forecasting weight to the power actual-use data of the past one year to generate the power usage forecasting information.

10. The AI based method according to claim 6, wherein the third step includes:

calculating usage of the electronic apparatus during the first period;

calculating power usage of the electronic apparatus based on weather or holiday information; and giving a weight based on the weather or holiday information of the first period to generate the power usage forecasting information.

\* \* \* \* \*